United States Patent [19]
Rohrlack et al.

[11] 3,724,625
[45] Apr. 3, 1973

[54] SEGMENTED FRICTION FOR BRAKE OR CLUTCH

[75] Inventors: Friedrich K. W. Rohrlack; Ralph R. Main, both of Troy, Ohio

[73] Assignee: The G. F. Goodrich Company, New York, N.Y.

[22] Filed: June 2, 1971

[21] Appl. No.: 149,190

[52] U.S. Cl..........................192/107 R, 188/218 XL
[51] Int. Cl...........................................F16d 69/100
[58] Field of Search .192/107 R, 107 M; 188/218 XL

[56] References Cited

UNITED STATES PATENTS 3,483,953   12/1969   Bender..........................188/218 XL
3,376,960   4/1968   Bender..........................192/107 R Primary Examiner—Allan D. Herrmann
Assistant Examiner—Randall Heald
Attorney—John D. Haney

[57] ABSTRACT

A brake or clutch mechanism having an annular stator or rotor with a plurality of individual segments. Each segment has a plate member of heat absorbing material held between facing members connected directly one to the other at radially outer corners through overlapping ears riveted together and to a spacer which fits in indentations at the outer corners of the plate member. At the inner periphery dovetail flanges of the facing members retain a radially extending tongue of the plate member and are connected at each side of the tongue to corresponding flanges on adjacent facing members by torque links with a beveled connection between the torque links and the dovetail flanges to resist twisting and turning of the facing members through a four-point mounting of each segment in the mechanism.

6 Claims, 4 Drawing Figures

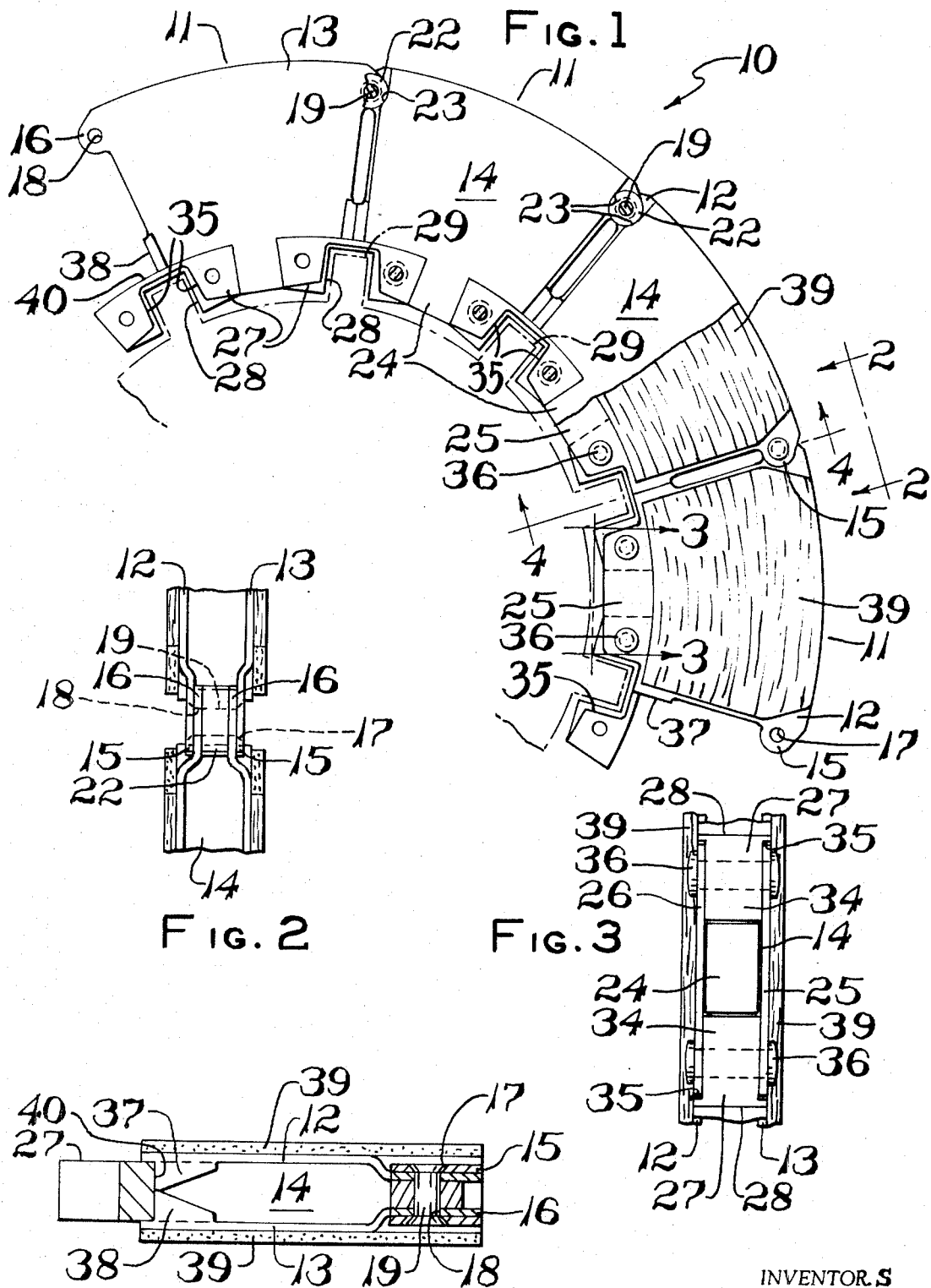

SEGMENTED FRICTION FOR BRAKE OR CLUTCH

BACKGROUND OF THE INVENTION

This invention relates to disc type brakes or clutches and particularly to the annular friction disc members which engage other friction disc members during operation of the brake or clutch. These friction disc members are referred to as the "heat sink elements" in high energy brakes such as those used, for example, in aircraft where they must absorb great quantities of heat during the braking operation. The friction disc members may have surfaces which engage friction surfaces on other disc members and these surfaces may carry friction lining material.

The high heat generated by brakes of this type has caused problems due to thermal warpage and cracking of annular brake discs and these problems have been reduced by using segmented friction disc members. In high energy aircraft type brakes, the necessary heat absorbing capacity has been obtained by positioning plates of heat absorbing material such as beryllium between facing members which support the heat sink material and have the necessary strength to absorb the high torque, wear and shock forces imposed on the friction disc members during operation.

In segmented friction disc members used heretofore, the facing members have been connected to a torque member at the inner periphery of the disc; however, it has been found that because of the braking forces tending to rotate the brake segments, the connection at the inner periphery did not provide the desired control of the movement of the segments. The connection of segments at the inner periphery by torque links also did not restrict the turning movement of the segments and accordingly there was a need for connections providing greater control of the segments during the braking operation.

SUMMARY OF THE INVENTION

According to this invention, the facing members of the segments have a direct connection to adjacent facing members at the outer periphery of the friction disc member so that the forces tending to move one edge of the segments radially inward are counteracted by the forces tending to move the opposing edge of an adjacent segment radially outward. These connections between segments at the outer periphery also serve to hold the facing members on opposite sides of the plate of heat sink material together and retain the heat sink plate in position between the facing members.

At the inner periphery the torque links between the adjacent segments are connected to the facing members in a manner to resist the turning forces on the segment and these connections also are located in such a manner as to provide for retaining the heat sink plate in position.

The accompanying drawings show one preferred form made in accordance with and embodying this invention and which is representative of how this invention may be practiced.

BRIEF DESCRIPTION OF THE DRAWINGS

In the drawings:

FIG. 1 is a side elevation of a part of an annular disc assembly (shown in solid lines), certain parts being broken away, and illustrated in torque driving engagement with a related part which, in this example, may be a splined torque tube, the sides of which are represented by the chain-dotted line;

FIG. 2 is an enlarged fragmentary view taken along the plane of line 2—2 of FIG. 1.

FIG. 3 is a fragmentary sectional view taken along the plane of line 3—3 of FIG. 1.

FIG. 4 is a sectional view taken along the plane of line 4—4 of FIG. 1.

DETAILED DESCRIPTION

Referring to FIG. 1, a friction disc assembly 10 is shown which includes a series of arcuate sector-shaped segments 11 having facing members 12 and 13 which may be of steel or other wear and shock resistant material between which are sandwiched heat sink bodies such as plates 14 which may be of beryllium or other high heat absorbing material.

At the outer periphery of the facing members 12 and 13, ears 15 and 16 extend circumferentially from the radially extending edges of the facing members in overlapping relation. These ears 15 and 16 may have matching holes 17 and 18 with a dimpled rim for receiving connecting rivets 19 in countersunk relation. A spacing member 22 may be sandwiched between the overlapping ears 15 and 16 and have a hole for passage of the rivet 19 through the spacing member.

As shown in FIG. 1, the plates 14 have indentations 23 at the outer corners which fit around the spacing member 22 so that the spacing member serves to retain the plates 14 in position between the facing members 12 and 13.

At the inner periphery of the plates 14 radially inwardly projecting members such as tongues 24 extend between dovetail flanges 25 and 26 of the facing members 12 and 13. Connected to the dovetail flanges 25 and 26 are torque links 27 having axially extending grooves 28 for engagement with mating interfitting splines 29 of an associated torque tube which is represented in chain-dotted lines. Each of the torque links 27 has connecting ends 34 which are recessed to provide beveled edges 35 for receiving the dovetail flanges 25 and 26 in mating engagement. The connecting ends 34 of the torque links 27 extend circumferentially between the dovetail flanges 25 and 26 to a position where the ends are spaced apart circumferentially to accommodate the tongues 24 of the plates 14 in the space surrounded by the dovetail flanges 25 and 26 and the ends 34 of the torque links 27. As shown in FIG. 3, connecting ends 34 of the torque links 27 and the dovetail flanges 25 and 26 on opposite sides of the connecting ends are fastened together by rivets 36.

The plates 14 are engagable at the inner periphery with the torque links 27 and flanges 37 and 38 at the radially extending edges of facing members 12 and 13 overlie the radially extending edges of the plates 14 at the inner periphery for retaining the plate against circumferential movement in this area. The flanges 37 and 38 also provide bearing surfaces against the radially outer faces 40 of the links 27 to resist turning moments of the facing members 12 and 13. As shown in FIG. 1, a friction lining material 39 may be adhered to the facing members 12 and 13 and may be of the type described and set forth in U. S. Pat. No. 2,966,737 of R. E. Spokes et al.

In the operation of this apparatus, the torque forces from the friction lining material 39 engaging another friction disc assembly are transmitted through the facing members 12 and 13 to the torque links 27 and then to the splines 29 of the torque tube. The resultant forces tending to rotate the segments 11 which would raise one radially extending edge while depressing the opposite edge are counteracted by the connections at the rivets 19 which constrain the rotating movement of the segments. In addition, the mating engagement of the beveled edges 35 of the torque links 27 with the dovetail flanges 25 and 26 of the facing members 12 and 13 provide a construction which resists twisting and relative rotation of the facing members and the torque links. The radially inwardly extending tongues 24 of the heat sink plates 14 extending between the dovetail flanges 25 and 26 and the connecting ends 34 of the torque links 27 provide for increased heat absorption and also structurally reinforce the flanges 25 and 26 where they are riveted to the torque links providing a ring structure counteracting the rotating action of the segments and transferring the torque to the torque links. Each segment 11 therefore has a four-point mounting of the facing members 12 and 13 with the spacing members 22, the plates 14 and the torque links 27 held therebetween in a stable structure resisting distortion of the friction disc assembly 10 while permitting the necessary adjustments caused by the high temperature differentials in the brake during operation.

We, therefore, particularly point out and distinctly claim as our invention:

1. A segmented friction member for a brake or a clutch comprising segments having radially extending edges and being assembled to form an annulus, each of said segments being connected at the outer periphery directly to adjacent segments at said radially extending edges and each of said segments being connected at the inner periphery to adjacent segments by torque link members connected at positions adjacent said radially extending edges and extending circumferentially of the friction member and each of said torque link members having means engagable with an associated brake or clutch structure for transmitting torque to or from the segment through the connections between said segment and said torque link members whereby the forces tending to rotate said segments are counteracted by the four connections between each of said segments and the adjacent segments at the outer periphery and inner periphery.

2. A segmented friction member according to claim 1 wherein each of said segments has a dovetail member at the inner periphery providing beveled corners for receiving mating edges of said torque link members to further resist rotation of said segments during transmission of torque to or from said torque link members.

3. A segmented friction member according to claim 1 wherein each of said segments has a heat sink body of heat absorbing material and substantially parallel facing members for frictional engagement with other brake or clutch members, said heat sink body being held between said facing members, each of said facing members having projecting circumferential ears at the outer periphery for overlapping projecting ears of facing members on adjacent segments and a fastener between the ears of said facing members for connecting said overlapping ears whereby said heat sink body is held in said friction member and rotation of said segments is counteracted.

4. A segmented friction member according to claim 3 wherein each of said facing members has a radially extending dovetail flange at the inner periphery providing edges for mating engagement with beveled edges of said torque link members, said torque link members being interposed between said flanges and fasteners extending through said flanges and said link members providing a connection at the inner periphery of said friction member for retaining said heat sink body and resisting twisting and turning of said segments.

5. A segmented friction member according to claim 4 wherein said heat sink body has a radially extending tongue at the inner periphery for disposition between the ends of said torque link members and said dovetail flanges and said heat sink body having recessed protions at the radially outer corners for receiving said fastener for retaining the heat sink body in position between said facing members.

6. A segmented friction member according to claim 5 wherein said facing members carry friction material on the surfaces radially outward of said dovetail flanges for frictional engagement with other brake or clutch members.

* * * * *